United States Patent
Liu et al.

(10) Patent No.: US 9,749,324 B2
(45) Date of Patent: Aug. 29, 2017

(54) SYSTEM, DEVICE AND METHOD FOR NETWORK AUTHORIZATION BASED ON NO PASSWORD OR RANDOM PASSWORD

(71) Applicants: Beijing Qihoo Technology Company Limited, Beijing (CN); Qizhi Software (Beijing) Company Limited, Beijing (CN)

(72) Inventors: Zhi Liu, Beijing (CN); Hongyi Zhou, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 15/028,252

(22) PCT Filed: Aug. 26, 2014

(86) PCT No.: PCT/CN2014/085181
§ 371 (c)(1),
(2) Date: Apr. 8, 2016

(87) PCT Pub. No.: WO2015/051674
PCT Pub. Date: Apr. 16, 2015

(65) Prior Publication Data
US 2016/0255081 A1  Sep. 1, 2016

(30) Foreign Application Priority Data
Oct. 9, 2013  (CN) .......................... 2013 1 0467702

(51) Int. Cl.
*G06F 7/04*  (2006.01)
*G06F 15/16*  (2006.01)
(Continued)

(52) U.S. Cl.
CPC .......... *H04L 63/10* (2013.01); *H04L 41/0803* (2013.01); *H04L 63/0876* (2013.01);
(Continued)

(58) Field of Classification Search
CPC ........ H04L 63/0876; H04L 12/2424–12/2427; H04L 41/08–41/0809;
(Continued)

(56) References Cited

U.S. PATENT DOCUMENTS 8,341,700 B2 * 12/2012 Malinen .................. H04L 63/08
380/247
2010/0115587 A1 * 5/2010 Kubota .................... G06F 21/34
726/3
(Continued)

FOREIGN PATENT DOCUMENTS

CN  101064628  10/2007
CN  101184099   5/2008
(Continued)

*Primary Examiner* — Daniel Potratz
(74) *Attorney, Agent, or Firm* — Harness, Dickey & Pierce, P.L.C.

(57) ABSTRACT

Disclosed are a system, device and method for network authorization based on no password or a random password, the device comprising: a memory having instructions stored thereon; at least one processor to execute the instructions to cause: obtaining information carried in a consult message by accessing a server, wherein the consult message is generated and sent to the server by a network access device upon reception of a connection establishment request message, and the consult message comprises network communication address information identifying uniquely the master control device and information of whether a terminal device is allowed to access a network; generating an instruction notification comprising instruction information according to user input information, wherein the instruction information comprises physical address information of the terminal device and information of whether allowing the terminal device to access the network; and sending the instruction notification so that the network access device, according to the instruction information, performing a network access (Continued)

operation upon determining that the terminal device is allowed to access the network, or performing a network access rejecting operation upon determining that the terminal device is prohibited to access the network.

12 Claims, 3 Drawing Sheets

(51) Int. Cl.
    *G06F 17/30*     (2006.01)
    *H04L 29/06*     (2006.01)
    *H04L 12/24*     (2006.01)
    *H04W 12/08*     (2009.01)

(52) U.S. Cl.
    CPC ............ *H04L 41/08* (2013.01); *H04L 63/101* (2013.01); *H04W 12/08* (2013.01)

(58) Field of Classification Search
    CPC .. H04L 41/0876–41/0893; H04L 41/28; H04L 51/38; H04L 43/00; H04L 43/06; H04L 43/065; H04L 43/08; H04L 43/0811; H04L 43/0852; H04L 43/0864; H04W 8/00; H04W 8/005
    See application file for complete search history.

(56) References Cited

U.S. PATENT DOCUMENTS

| | | | |
|---|---|---|---|
| 2013/0097674 A1* | 4/2013 | Jindal | ................. H04L 63/0876 726/4 |
| 2014/0053281 A1* | 2/2014 | Benoit | ................ H04L 12/2809 726/29 |
| 2014/0092899 A1* | 4/2014 | Krishna | .............. H04L 61/2517 370/389 |

FOREIGN PATENT DOCUMENTS

| | | |
|---|---|---|
| CN | 101299694 | 11/2008 |
| CN | 101436972 | 5/2009 |
| CN | 101909298 | 12/2010 |
| CN | 102348209 | 2/2012 |
| CN | 102625468 | 8/2012 |
| CN | 103532946 | 1/2014 |
| WO | 2013/044126 | 3/2013 |

* cited by examiner

SYSTEM, DEVICE AND METHOD FOR NETWORK AUTHORIZATION BASED ON NO PASSWORD OR RANDOM PASSWORD

TECHNICAL FIELD

The present invention relates to the field of network access techniques and particularly to a system, device and method for network authorization based on no password or a random password.

DESCRIPTION OF RELATED ART

At present a user equipment and particularly a mobile terminal typically accesses a network through a network access device (e.g., a wireless routing device, etc.), for example, it accesses the Internet, a local area network, etc. wirelessly.

An existing implementation in which a user equipment accesses a network through a network access device will be described below by an example in which the user equipment is a mobile terminal and the network access device is a wireless routing device.

Firstly the mobile terminal searches for the wireless routing device, and is connected wirelessly with the wireless routing device, and thereafter when the wireless routing device determines that the mobile terminal has an access privilege, the wireless routing device enable the mobile terminal to access the network; otherwise, the mobile terminal will be required to input a username and a password; and thereafter the wireless routing device verifies the username and the password input by the mobile terminal according to usernames and passwords pre-stored in the wireless routing device, and if they are verified to be correct, then the wireless routing device allows the mobile terminal to access the network; otherwise, the wireless routing device prohibits the mobile terminal from accessing the network.

In some application scenarios, a temporary demand to access a network tends to occur, for example, when there is a visitor at home, a customer in an office, etc., the visitor or the customer user may have a temporary demand to access the network; and this demand is typically satisfied in one of the following solutions:

In a first solution, the visitor or the customer is provided with a username and a password of an owner so that the accessing user can access the network by using the username and the password of the owner.

In a second solution, the wireless routing device can provide a visitor network, that is, the wireless routing device creates a new wireless hotspot specially for the accessing user, and allocates a username and a password for the new wireless hotspot so that the visitor or the customer can access limitedly to the network by using the username and the password.

In a particular example, the wireless routing device creates two wireless hotspots, one for a visitor network, and the other for a home network; and the wireless routing device is configured as two Virtual Local Area Networks (Vlans), which are named respectively as Vlan0 and Vlan1, and the visitor or the customer can access the network by using a username and a password of the Vlan0 corresponding to the visitor network, and moreover the wireless routing device can prohibit a user of the visitor network from logging into the home network, by isolating network segments from each other.

In a third solution, the demand is addressed using the Wi-Fi Protected Setup (WPS), that is, the WPS is triggered on both the wireless routing device and the mobile terminal needing to access the network simultaneously, and then the wireless routing device will be connected with the mobile terminal, thereby the mobile terminal can access the network.

During making the invention the inventors have recognized that, in the first solution above, the accessing user needs to input the username and the password, and even when an Internet TV set at home needs to access the network, the username and the password will need to be input, so it may not be operationally convenient and rapid for the visitor or the customer to access the network because the user has to memorize the username and the password; and moreover some potential security risk may also exist when the username and the password of the owner leak out; in the second solution above, the user also needs to input the username and the password, so alike it may not be operationally convenient and rapid to access the network; and in the third solution above, a visitor privilege for a WPS-based wireless access cannot be set, so there may be some potential security risk, and moreover there are a small number of WPS-enabled devices, so an application scope thereof may be somewhat limited.

BRIEF SUMMARY OF THE INVENTION

In view of the problems above, the invention has been made to provide a method for network authorization based on no password or a random password, and a corresponding system and device for network authorization based on no password or a random password to overcome at least part of the problems above.

According to an aspect of the invention, there is provided a method for network authorization based on no password or a random password, wherein the method includes: receiving, by a network access device, a connection establishment request message from a terminal device; performing, by the network access device, a consult operation according to the connection establishment request message, wherein the consult operation comprises: generating, by the network access device, a consult message comprising network communication address information identifying uniquely a master control device and information of whether the terminal device is allowed to access a network, and sending the consult message to a server connected therewith, and the network communication address information of the master control device is pre-stored in the network access device; obtaining, by the master control device, the information carried in the consult message by accessing the server; generating and sending, by the master control device according to user input information, an instruction notification comprising instruction information, wherein the instruction information comprises physical address information of the terminal device and information of whether allowing the terminal device to access the network; and performing, by the network access device according to the instruction information from the master control device, a network access operation upon determining that the terminal device is allowed to access the network, or performing a network access rejecting operation upon determining that the terminal device is prohibited to access the network.

According to another aspect of the invention, there is provided a system for network authorization based on no password or a random password, wherein the system includes: a receiving module, arranged in a network access device, configured to receive a connection establishment request message from a terminal device; a consult module, arranged in the network access device, configured to perform a consult operation according to the connection establishment request message, wherein the consult operation comprises: generating, by the network access device, a consult message comprising network communication address information identifying uniquely a master control device and information of whether the terminal device is allowed to access a network, and sending the consult message to a server connected therewith, and the network communication address information of the master control device is pre-stored in the network access device; an obtaining module, arranged in the master control device, configured to obtain the information carried in the consult message by accessing the server; an authorizing module, arranged in the master control device, configured to generate an instruction notification comprising instruction information according to user input information, wherein the instruction information comprises physical address information of the terminal device and information of whether allowing the terminal device to access the network; a sending module, arranged in the master control device, configured to send the instruction notification; and an access control module, arranged in the network access device, configured to, according to the instruction information from the master control device, perform a network access operation upon determining that the terminal device is allowed to access the network, or perform a network access rejecting operation upon determining that the terminal device is prohibited to access the network.

According to further another aspect of the invention, there is provided a method for network authorization based on no password or a random password, wherein the method includes: obtaining, by a master control device, information carried in a consult message by accessing a server, wherein the consult message is generated and sent to the server by a network access device upon reception of a connection establishment request message, and the consult message comprises network communication address information identifying uniquely the master control device and information of whether the terminal device is allowed to access a network; generating, by the master control device, an instruction notification comprising instruction information according to user input information, wherein the instruction information comprises physical address information of the terminal device and information of whether allowing the terminal device to access the network; and sending, by the master control device, the instruction notification so that the network access device, according to the instruction information from the master control device, performs a network access operation upon determining that the terminal device is allowed to access the network, or performs a network access rejecting operation upon determining that the terminal device is prohibited to access the network.

According to still further another aspect of the invention, there is provided a master control device including: an obtaining module, arranged in the master control device, configured to obtain information carried in a consult message by accessing a server, wherein the consult message is generated and sent to the server by a network access device upon reception of a connection establishment request message, and the consult message comprises network communication address information identifying uniquely the master control device and information of whether a terminal device is allowed to access a network; an authorizing module, arranged in the master control device, configured to generate an instruction notification comprising instruction information according to user input information, wherein the instruction information comprises physical address information of the terminal device and information of whether about allowing the terminal device to access the network; and a sending module, arranged in the master control device, configured to send the instruction notification so that the network access device, according to the instruction information from the master control device, performs a network access operation upon determining that the terminal device is allowed to access the network, or performs a network access rejecting operation upon determining that the terminal device is prohibited to access the network.

In the method, system and device for network authorization based on no password or a random password according to embodiments of the invention, for a terminal device needing to access a network (e.g., a terminal device having no any access privilege), the master control device can be consulted to determine whether to allow the terminal device to access the network, and when the network access device is granted by the master control device, the terminal device can be enabled to access the network without inputting any username or password, thus addressing the problems that it may not be convenient or rapid for the terminal device to access the network and that the user has to memorize the username and the password, and avoiding the potential security risk arising from providing the visitor with the username and the password and from failing to limiting the access privilege of the terminal device, and the application scope of the inventive method, system and device for network authorization can be extended easily.

The foregoing description is merely a summary of the technical solutions of the invention, and in order to make the technical means of the invention more apparent and enable them to be practiced according to this disclosure of the description, and in order to make the foregoing and other objects, features, and advantages of the invention more apparent and readily understood, particular embodiments of the invention will be described below.

BRIEF DESCRIPTION OF THE DRAWINGS

Various other advantages and benefits will become apparent to those ordinarily skilled in the art upon review of the following detailed description of preferred embodiments. The drawings of the invention are merely intended to illustrate the preferred embodiments but not to limit the invention. Alike reference numerals will denote alike components through the drawings in which.

DETAILED DESCRIPTION OF THE INVENTION

Figure 1:
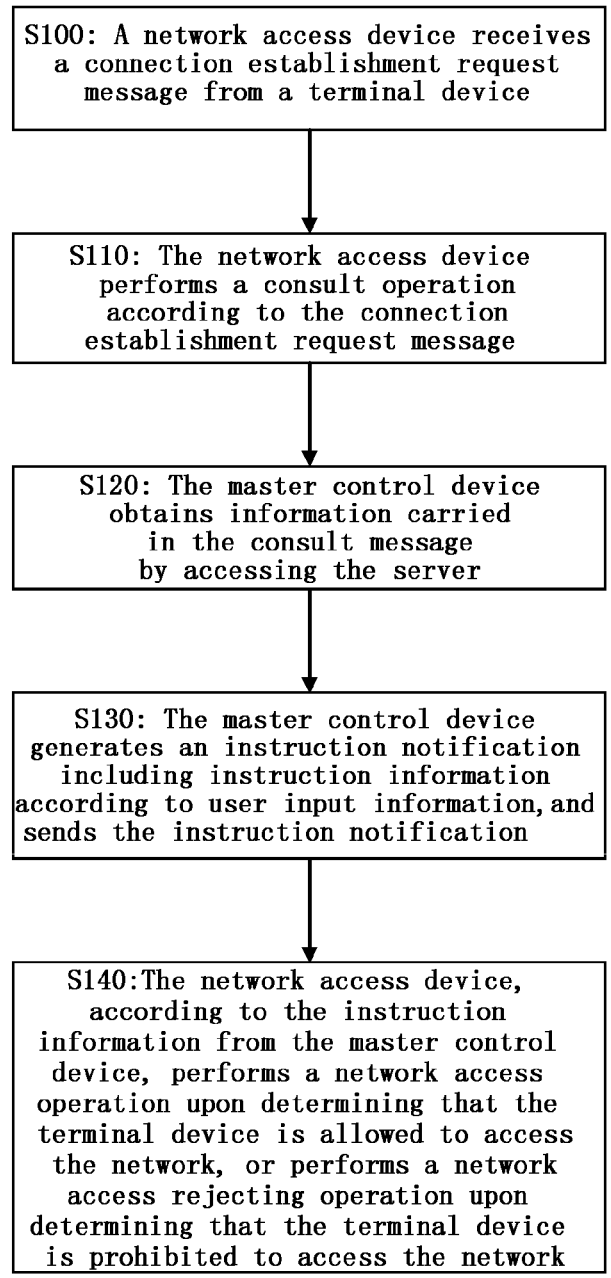
FIG. 1 illustrates a flow chart of a method for network authorization based on no password or a random password according to an embodiment of the invention.

Exemplary embodiments of this disclosure will be described below in further details with reference to the drawings. Although the exemplary embodiments of this disclosure are illustrated in the drawings, it shall be appreciated that this disclosure can be embodied in various forms and will not be limited to the embodiments described here. On the contrary these embodiments are provided so that this disclosure can become more apparent and the scope of this disclosure can be conveyed fully to those skilled in the art.

A first embodiment relates to a method for network authorization based on no password or a random password. A flow of this method is as illustrated in FIG. 1.

At S100 in FIG. 1, a network access device receives a connections establishment request message from a terminal device.

Particularly the terminal device can be an intelligent mobile phone, a tablet, a computer (e.g., a notebook computer), etc., and the terminal device is typically configured for an accessing user needing a temporary access to a network (e.g., a visitor at home, a customer at office, etc.), but the terminal device can alternatively be configured for another form of accessing user, e.g., as an Internet TV set at home, etc.; and the network access device can be a routing device (e.g., an enterprise wired routing device, a home wired routing device, etc.), and particularly a wireless routing device (e.g., a home wireless routing device, an enterprise wireless routing device, etc.) or can be a switch (e.g., a home switch, an enterprise switch, etc) or another device.

A login password may or may not be set for the network access device. If no login password is set for the network access device, then in order to avoid as much as possible an unrelated accessing user (e.g., a neighbor, etc.) from interfering, the network access device can declare in a broadcast manner that a login password is set for the network access device, so that an unrelated accessing user typically will not try to access the network through the network access device.

When the network access device is a wireless routing device, the terminal device, which has searched for wireless access hotspots, will send the connection establishment request message to the network access device corresponding to the wireless access hotspot selected by the terminal device, for being connected wirelessly with the network access device.

At S110, the network access device performs a consult operation according to the connection establishment request message.

Particularly the network access device can perform the consult operation upon determining that the terminal device has no access privilege according to physical address information of the terminal device carried in the connection establishment request message, where the physical address information of the terminal device should be information which can uniquely identify a physical device, and the physical address information of the terminal device typically can be Media Access Control (MAC) address information, etc.

The network access device can determine whether to perform the consult operation according to information pre-stored in the network access device (e.g., a blacklist, etc.) and the physical address information of the terminal device carried in the connection establishment request message, for example, when the network access device determines that the terminal device is neither a user rejected to access the network nor a user allowed to access the network, the network access device will determine that the terminal device has no access privilege (that is, an unknown/unclear network access privilege), and the network access device needs to perform the consult operation; and if the network access device determines that the terminal device is a user rejected to access the network (e.g., a user in the blacklist), then the network access device will reject directly the terminal device to access the network.

The consult operation performed by the network access device can include particularly that the network access device generates a corresponding consult message, and sends the consult message to a server connected therewith. The connection between the network access device and the server is typically a long connection. Information carried in the consult message mainly includes: network communication address information identifying uniquely a master control device and information about whether to allow the terminal device to access the network; and optionally the consult message can further carry a host name of the terminal device, type of the terminal device, etc. The network communication address information identifying uniquely the master control device can be physical address information of the master control device (e.g., an MAC address thereof), a mobile phone number, an instant communication account (e.g., a QQ account number), etc. The information about whether to allow the terminal device to access the network can include physical address information of the terminal device, a consult flag, etc. The network communication address information identifying uniquely the master control device is typically pre-stored in the network access device, for example, by being registered, etc.

Moreover the consult operation performed by the network access device can further include: allocating a network address for the terminal device, where the network address shall belong to a network segment, in which an access to the network is currently unavailable, in an isolated zone (the network access device supports a Service Set Identifier (SSID)).

At S120, the master control device obtains the information carried in the consult message by accessing the server.

Particularly the master control device can be a desktop computer, a notebook computer, a tablet computer, an intelligent mobile phone, etc. The server can determine which master control device shall be provided with the information in the consult message according to the network communication address information identifying uniquely the master control device carried in the consult message (e.g., the physical address information of the master control device); and the information provided by the server to the master control device can include the network communication address information identifying uniquely the terminal device (e.g., the physical address information of the terminal device or the QQ account number, etc.) and the information about whether to allow the terminal device to access the network, and the information provided to the master control device can further include the host name of the terminal device, the type of the terminal device, etc., so that the master control device can know the information as much as possible about the terminal device trying to access the network. The information provided by the server to the master control device can be pushed to the master control device when the master control device is accessing the server on its own initiative, for displaying to the user.

The master control device can access the server on its own initiative by starting a corresponding application, and display a friendly interaction interface to the user according to the information pushed by the server so that the user can decide whether to allow or prohibit the terminal device to access the network.

It should be particularly noted that after receiving the consult message the server can determine, based on the information stored in the server (e.g., the blacklist, etc.), whether to provide the master control device with corresponding information according to the consult message; and in a particular example, according to an instruction notification ever sent by the master control device the server can store the physical address information of the terminal device prohibited by the master control device to access the network and information about the network access device (e.g., the physical address information of the network access device), so that when the terminal device currently tries to access the network through the network access device and thus the server receives the consult message, the server can determine whether to provide the master control device with the corresponding information by referring to the stored information, for example, when the number of times that the terminal device is prohibited by the master control device to access the network reaches a predetermined number of times, even receiving the consult message sent by the network access device the server will not provide the master control device with the corresponding information, but will send information about prohibiting the terminal device to access the network directly to the network access device, At S130, the master control device generates an instruction notification including instruction information according to user input information, and thereafter the master control device sends the instruction notification.

Particularly the user can input corresponding information (for example, the user inputs "Y" or "N", checks or clicks on an Access Allowed button/Access Prohibited button in a box, etc.) to indicate whether he or she allows the terminal device to access the network. The instruction information in the instruction notification generated by the master control device according to the user input information generally includes: the physical address information of the terminal device, the information of whether allowing the terminal device to access the network indicated by the user input information, wherein the physical address information of the terminal device can be obtained by the master control device from the information pushed by the server.

When the master control device is not connected directly with the network access device, the master control device can send the instruction notification to the server, so that the server further generates an indication message from the instruction information carried in the instruction notification; and thereafter the server sends the indication message to the network access device.

The master control device can send the instruction notification to the server in a network data based message (e.g., a QQ message, etc.), a short message (i.e., a short message, a multimedia message, etc.), an email, etc.

When the master control device is connected directly with the network access device, the master control device can send the instruction notification (e.g., a URL based message) directly to the network access device; and when generating the instruction notification the master control device shall consider that the instruction notification can be parsed successfully by the network access device. Of course, in this case, the master control device still can sends the instruction notification to the network access device through the server.

At S140, according to the instruction information from the master control device the network access device performs a network access operation upon determining that the terminal device is allowed to access the network, or performs a network access rejecting operation upon determining that the terminal device is prohibited to access the network.

Particularly when receiving the indication message sent by the server or the instruction notification sent directly by the master control device, the network access device can obtain the instruction information from the information carried in the indication message/instruction notification; and the network access device can parse the obtained instruction information to thereby definitely ascertain whether the master control device allows the terminal device to access the network, and if the master control device allows the terminal device to access the network, then the network access device can enable the terminal device to access the network in different modes. For example, the network access device enables the terminal device to access the network while locating the terminal device in the isolated zone, and at this time, the terminal device still can apply the network address initially allocated thereto in the isolated zone, but the network access device will not prohibit the network address from accessing to the network any longer; and in another example, the network access device enables the terminal device to access the network and not isolating the terminal device in the isolated zone; and at this time, the terminal device still can apply the network address initially allocated thereto in the isolated zone, but the network access device will not attribute the network address to the isolated area any longer, of course, the network access device can alternatively reallocate a network address for the terminal device so that the terminal device can have the same network access privilege as the master control device, for example, the terminal device can access a home network, etc.

If the master control device prohibits the terminal device to access the network, then the network access device does not perform the network access operation above, and can further store the network communication address information identifying uniquely the terminal device (e.g., the physical address information of the terminal device), so that when the terminal device tries to access the network through the network access device next time, the network access device can determine whether to consult the master control device by referring to this information, for example, when the number of times that the terminal device is prohibited by the master control device to access the network through the network access device reaches the predetermined number of times, the network access device can list the terminal device in the blacklist, so that no further consult message will be sent subsequently for the terminal device.

A second embodiment relates to a system for network authorization based on no password or a random password. The system is structured as illustrated in FIG. 2

Figure 2:
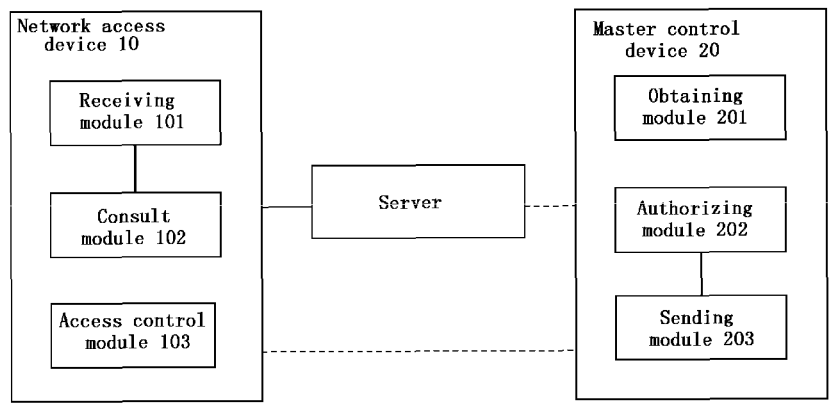
FIG. 2 illustrates a schematic diagram of a system for network authorization based on no password or a random password according to an embodiment of the invention.

The system for network authorization illustrated in FIG. 2 includes a network access device 10 and a master control device 20, wherein the network access device 10 is connected with the master control device 20 through a server, and the master control device 20 can be connected with the network access device 10 directly or through the server.

The network access device 10 includes a receiving module 101, a consult module 102, and an access control module 103; and the master control device 20 includes an obtaining module 201, an authorizing module 202, and a sending module 203, wherein the network access device 10 can further include a broadcasting module (not illustrated in FIG. 2).

It should be noted that this embodiment will be described by an example in which one server is connected respectively with one network access device 10 and one master control device 20, but in a real application, one server can be connected concurrently with more than one network access device 10 and more than one master control device 20.

The network access device 10 can be a routing device, and particularly a wireless routing device (e.g., a home wireless routing device, an enterprise wireless routing device, etc.) or can be a switch (e.g., a home switch, an enterprise switch, etc) or another device; and moreover a login password may or may not be set for the network access device 10. When no login password is set for the network access device 10, the broadcasting module in the network access device 10 can declare in a broadcast manner that the login password is set for the network access device 10, so that an unrelated accessing user typically will not try to access the network through the network access device 10.

The receiving module 101 is connected with the consult module 102; and the receiving module 101 is mainly configured to receive a connection establishment request message from a terminal device (e.g., an intelligent mobile phone, a tablet computer, a computer, an intelligent Internet TV set, etc.)

The consult module 102 is mainly configured to obtain physical address information of the terminal device from the connection establishment request message received by the receiving module 101, and to perform a consult operation, for example, the consult module 102 performs the consult operation upon determining, according to the physical address information of the terminal device, that the terminal device has no access privilege.

Particularly the physical address information of the terminal device can be information which identify uniquely a physical device, the physical address information of the terminal device typically can be Media Access control (MAC) address information.

The consult module 102 can determine whether to perform the consult operation according to information pre-stored by the consult module 102 (e.g., a blacklist, etc.) and the physical address information of the terminal device carried in the connection establishment request message, for example, when the consult module 102 determines that the terminal device is neither a user rejected to access the network nor a user allowed to access the network, the consult module 102 determines that the terminal device has no access privilege (that is, an unknown/unclear network access privilege), and the consult module 102 needs to perform the consult operation; and if the consult module 102 determines that the terminal device is a user rejected to access the network (e.g., a user in the blacklist), then the consult module 102 rejects directly the terminal device to access the network.

The consult operation performed by the consult module 102 particularly include: the consult module 102 generates a corresponding consult message, and sends the consult message to a server connected with the network access device 10 where the consult module 102 resides. The connection between the network access device 10 and the server is typically a long connection. Information carried in the consult message mainly includes: network communication address information identifying uniquely the master control device and information about whether to allow the terminal device to access the network; and optionally the consult message can further carry a host name of the terminal device, type of the terminal device, etc. The network communication address information identifying uniquely the master control device can be physical address information of the master control device (e.g., an MAC address), a mobile phone number, an instant communication account (e.g., a QQ account number), etc. The information about whether to allow the terminal device to access the network can include the physical address information of the terminal device, a consult flag, etc.

Moreover the consult operation performed by the consult module 102 can further include: allocating a network address for the terminal device, wherein the network address should belong to a network segment, in which an access to the network is currently unavailable, in an isolated zone.

The obtaining module 201 is mainly configured to obtain the information carried in the consult message sent by the network access device 10 by accessing the server on its own initiative.

Particularly the server can determine which master control device shall be provided with the information in the consult message according to the physical address information of the master control device carried in the consult message; and the information provided to the master control device can include the network communication address information identifying uniquely the terminal device and the information about whether to allow the terminal device to access the network, and the information provided to the master control device can further include the host name of the terminal device, the type of the terminal device, etc., so that the master control device can know the information as much as possible about the terminal device trying to access the network.

The obtaining module 201 can be configured in an application, and when the application is started, the obtaining module 201 accesses the server on its own initiative, and displays a friendly interaction interface to the user according to the information pushed by the server so that the user decides allowing or prohibiting the terminal device to access the network.

The authorizing module 202 is connected with the sending module 203; and the authorizing module 202 is mainly configured to generate an instruction notification including instruction information according to user input information.

The user can input corresponding information (for example, the user inputs "Y" or "N", checks or clicks on an Access Allowed button/Access Prohibited button in a box, etc.) to indicate whether he or she allows the terminal device to access the network. The instruction information in the instruction notification generated by the authorizing module 202 mainly includes: the physical address information of the terminal device, the information of whether allowing the terminal device to access the network indicated by the user input information, wherein the physical address information of the terminal device can be obtained by the authorizing module 202 from a consult instruction received by the master control device.

The sending module 203 is mainly configured to send the instruction notification generated by the authorizing module 202;

Particularly when the master control device 20 is not connected directly with the network access device 10, the sending module 203 can send the instruction notification to the server, then the server further generates an indication message according to the instruction information carried in the instruction notification, and thereafter the server sends the indication message to the network access device 10.

The sending module 203 can send the instruction notification to the server in a network data based message (e.g., a QQ message, etc.), a short message (i.e., a short message, a multimedia message, etc.), an email, etc.

When the master control device 20 is connected directly with the network access device 10, the sending module 203 can send the instruction notification (e.g., a URL based message) directly to the network access device 10. That is, when generating the instruction notification the authorizing module 202 shall consider that the instruction notification can be parsed successfully by the network access device 10. Of course, in this case, the sending module 203 still can send the instruction information to the network access device 10 through the server.

The access controlling module 103 is mainly configured to, according to the instruction information from the master control device, perform a network access operation upon determining that the terminal device is allowed to access the network, or perform a network access rejecting operation upon determining that the terminal device is prohibited to access the network.

Particularly when the network access device 10 receives the indication message sent by the server or the instruction notification sent directly by the master control device 20, the access controlling module 103 can obtain the instruction information from the information carried in the indication message/instruction notification; and the access controlling module 103 can parse the obtained instruction information to thereby definitely ascertain whether the master control device 20 allows the terminal device to access the network, and if the master control device 20 allows the terminal device to access the network, then the access controlling module 103 can enable the terminal device to access the network in different modes. For example, the access controlling module 103 enables the terminal device to access the network and locates the terminal device in the isolated zone; and in another example, the access controlling module 103 enables the terminal device to access the network and not isolating the terminal device in the isolated zone so that the terminal device can have the same network access privilege as the master control device 20, for example, the terminal device can access a home network, etc.

If the master control device 20 prohibits the terminal device to access the network, then when the access controlling module 103 does not perform the network access operation above, the access controlling module 103 can further store the network communication address information identifying uniquely the terminal device (e.g., the physical address information of the terminal device), so that when the terminal device tries to access the network through the network access device 10 next time, the network access device 10 can determine whether to consult the master control device 20 by referring to this information, for example, when the number of times that the terminal device is prohibited by the master control device 20 to access the network through the network access device 10 reaches a predetermined number of times, the access controlling module 103 can list the terminal device in the blacklist, so that the consult module 102 will not send any consult message subsequently for the terminal device any longer.

The algorithms and displays provided here will not be inherently relevant to any particular computer, virtual system or another device. Various general systems can also be used with the teaching based upon the disclosure here. According to the description above, the structure required for configuring these systems will be apparent. Moreover the invention will not be directed to any particular programming language. It shall be appreciated that the disclosure of the invention described here can be put into practice in a variety of programming languages, and the description made above in terms of the particular language is merely for the purpose of disclosing the best modes of the invention.

Numerous particular details have been given in the description provided here. However it shall be appreciated that the embodiments of the invention can be put into practice without these particular details. In some examples, well-known methods, structures and technologies have not be illustrated in details so as not to obscure understanding of the description.

Similarly it shall be appreciated that in order to simplify the disclosure and facilitate understanding of one or more of the respective aspects of the invention, in the description above of the exemplary embodiments of the invention the respective features of the invention sometimes have been grouped together in a single embodiment or figure or a description thereof. However the method disclosed here shall not be construed as reflecting such an intension that more than the features expressively recited in each claims will be required for the invention as claimed here. More precisely, less than all the features in the single embodiment disclosed earlier will be required in any aspect of the invention as reflected in the appended claims. Thus the particular claims complying with the particular embodiments will be hereby incorporated expressively into the particular embodiments, where each of the claims itself is embodied as a separate embodiment of the invention.

Those skilled in the art can appreciate that the modules in the device according to the embodiment can be modified adaptively and they can be arranged in one or more devices different from the embodiment. The modules or units or components in the embodiment can be combined into a single module or unit or component, and moreover they each can be divided into a number of sub-modules or sub-units or sub-components. Unless at least some of these features and/or processes or elements are mutually exclusive, the respective features disclosed in the description (including the appended claims, the abstract and the drawing) and the respective processes or elements in any method or device disclosed as such can be combined in any combination. Unless stated otherwise, each of the features disclosed in the description (including the appended claims, the abstract and the drawing) can be replaced by an alternative feature for the same, equivalent or similar purpose.

Moreover those skilled in the art can appreciate that although some embodiments described here include some features included in other embodiments rather than other features, the features in the different embodiments can be combined into further different embodiments without departing from the scope of the invention. For example, any of the embodiments claimed in the appended claims can be applied in any combination.

The respective components in the embodiments of the invention can be embodied in hardware or in software modules run in one or more processors or in any combination of both. Those skilled in the art shall appreciate that some or all of the functions of some or all of the components in the device for switching a user mode of an intelligent terminal according to the embodiment of the invention can be performed in a microprocessor or a Digital Signal Processor (DSP) in practice. The invention can also be embodied as a device or device program (e.g., a computer program and a computer program product) for performing a part or all of the method described here. Such a program in which the invention is embodied can be stored on a computer readable medium or can be embodied in the form of one or more signals. The signal or signals can be downloaded from a website on the Internet or can be available on a carrier signal or can be provided in any other form.

Figure 3:
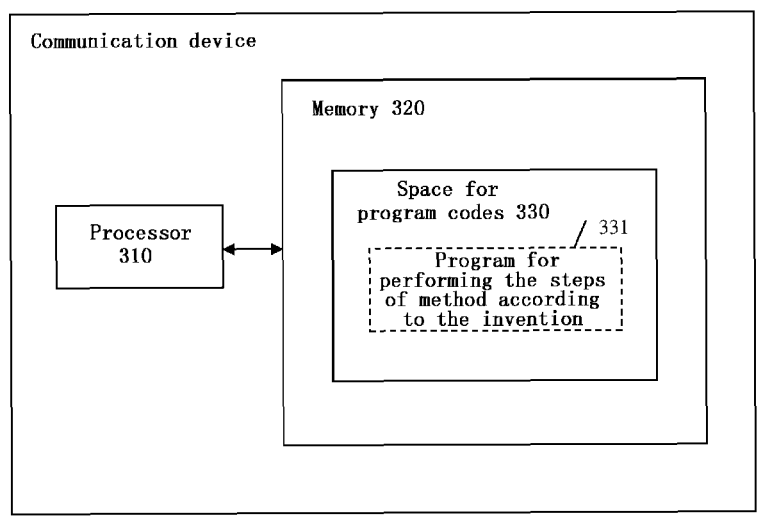
FIG. 3 illustrates a block diagram of a communication device for performing the method according to the invention.
Figure 4:
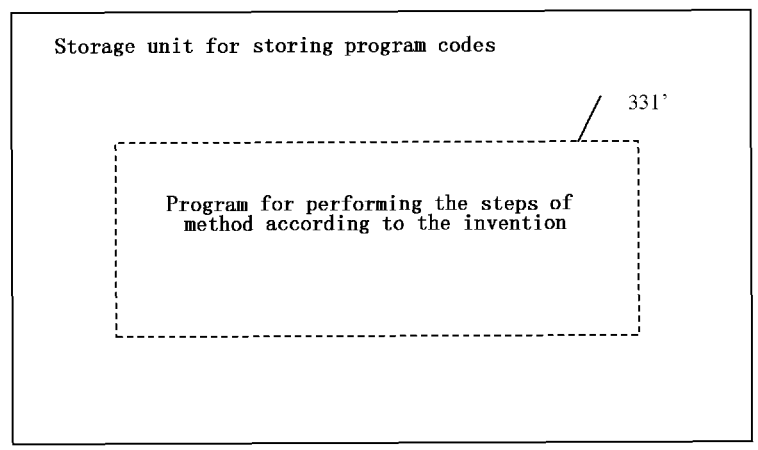
FIG. 4 illustrates a schematic diagram of a storage unit for holding or carrying program codes to perform the method according to the invention.

For example, FIG. 3 illustrates a communication device in which the method for network authorization based on no password or a random password according to the invention can be embodied. The communication device traditionally includes a processor 310, and a computer program product or a computer readable medium in the form of a memory 320. The memory 320 can be an electronic memory, e.g., a flash, an Electrically Erasable Programmable Read Only Memory (EEPROM), an EPROM, a hard disk, an ROM, etc. The memory 320 is provided with a storage space 330 of program codes 331 for performing any of the steps in the method above. For example, the storage space 330 of the program codes can include respective program codes 331 for performing the respective steps in the method above respectively. These program codes can be read from or written into one or more computer program products including a program code carrier, e.g., a hard disk, a Compact Disk (CD), a memory card, a floppy disk, etc. The computer program product or products is or are typically a portable or fixed storage unit as illustrated in FIG. 4. The storage unit can be provided with storage segments, a storage space, etc., arranged similarly to the memory 320 in the terminal device illustrated in FIG. 3. The program codes can be compressed in an appropriate form, for example. Typically the storage unit includes computer readable codes 331', i.e., codes which can be read by a processor, e.g., the processor 310, etc., and which upon being executed by the terminal device cause the terminal device to perform the respective steps in the method described above.

It shall be noted that the embodiments above are intended to illustrate but not to limit the invention, and those skilled in the art can devise alternative embodiments without departing from the scope of the appended claims. Any reference numerals placed between parentheses in the claims shall not be construed as limiting the scope of the claims. The term "comprises/comprising" shall not preclude the presence of an element or a step which has not been listed in any claim. The term "a/an" preceding an element shall not preclude the presence of a plurality of such elements. The invention can be embodied in hardware including several different elements or in an appropriately programmed computer. In any claim in which several units of a device are listed, several of the units can be embodied particularly in the same item of hardware. The use of the terms "first", "second", "third", etc., shall not suggest any particular order, but these terms can be interpreted as names.

The invention claimed is:

1. A master control device, comprising:
a memory having instructions stored thereon; and
at least one processor configured to execute the instructions to:
obtain information carried in a consult message by accessing a server, the consult message generated and sent to the server by a network access device upon reception of a connection establishment request message, and the consult message comprising network communication address information identifying uniquely the master control device and information of whether a terminal device is allowed to access a network, the network communication address information of the master control device pre-stored in the network access device;
generate an instruction notification comprising instruction information according to user input information, the instruction information comprising physical address information of the terminal device and information of whether the terminal device is allowed to access the network; and
send the instruction notification so that the network access device, according to the instruction information, performs a network access operation upon determining that the terminal device is allowed to access the network, or performs a network access rejecting operation upon determining that the terminal device is prohibited to access the network.

2. The device according to claim 1, wherein sending the instruction notification comprises:
sending the instruction notification directly to the network access device if the master control device is connected directly with the network access device; and
sending the instruction notification to the server if the master control device is not connected directly with the network access device, so that the server generates an indication message according to the instruction information carried in the instruction notification, and sends the indication message to the network access device.

3. A method for network authorization based on no password or a random password, the method comprising:
receiving, by a network access device, a connection establishment request message from a terminal device;
performing, by the network access device, a consult operation according to the connection establishment request message, the consult operation comprising:
generating, by the network access device, a consult message comprising network communication address information identifying uniquely a master control device and information of whether the terminal device is allowed to access a network, and sending the consult message to a server connected therewith, the network communication address information of the master control device pre-stored in the network access device;
obtaining, by the master control device, the information carried in the consult message by accessing the server;
generating and sending, by the master control device according to user input information, an instruction notification comprising instruction information, the instruction information comprising network communication address information identifying uniquely the terminal device and information of whether the terminal device is allowed to access the network; and
performing, by the network access device according to the instruction information from the master control device, a network access operation upon determining that the terminal device is allowed to access the network, or performing a network access rejecting operation upon determining that the terminal device is prohibited to access the network.

4. The method according to claim 3, wherein performing, by the network access device, the consult operation according to the connection establishment request message comprises:
performing, by the network access device, the consult operation upon determining that the terminal device has no access privilege according to the physical address information of the terminal device carried in the connection establishment request message.

5. The method according to claim 3, wherein the consult operation further comprises:
allocating, by the network access device, a network address for the terminal device, wherein the network address belongs to a network segment, in which an access to the network is currently unavailable, in an isolated zone.

6. The method according to claim 3, wherein a login password is set for the network access device or no login password is set for the network access device; and if no login password is set for the network access device, then the network access device declares in a broadcast manner that a login password is set for the network access device.

7. The method according to claim 3, wherein:
if the master control device is connected directly with the network access device, then the master control device sends the instruction notification directly to the network access device; or
the master control device sends the instruction notification to the server, and the server generates an indication message according to the instruction information carried in the instruction notification, and sends the indication message to the network access device.

8. The method according to claim 3, wherein the consult message further comprises at least one of a host name of the terminal device and a type of the terminal device.

9. The method according to claim 3, wherein the server provides the master control device accessing the server with a display interface comprising the network communication address information identifying uniquely the terminal device.

10. The method according to claim 3, wherein performing the network access operation comprises:
enabling, by the network access device, the terminal device to access the network and isolating the terminal device in an isolated zone; or
enabling, by the network access device, the terminal device to access the network and not isolating the terminal device in an isolated zone.

11. A method for network authorization based on no password or a random password, the method comprising:
obtaining, by a master control device, information carried in a consult message by accessing a server, the consult message generated and sent to the server by a network access device upon reception of a connection establishment request message, and the consult message comprising network communication address information identifying uniquely the master control device and information of whether the terminal device is allowed to access a network, the network communication address information of the master control device pre-stored in the network access device;
generating, by the master control device, an instruction notification comprising an instruction information according to user input information, the instruction information comprising physical address information of the terminal device and information of whether the terminal device is allowed to access the network; and
sending, by the master control device, the instruction notification so that the network access device, according to the instruction information from the master control device, performs a network access operation upon determining that the terminal device is allowed to access the network, or performs a network access rejecting operation upon determining that the terminal device is prohibited to access the network.

12. The method according to claim 11, wherein sending, by the master control device, the instruction notification comprises:
if the master control device is connected directly with the network access device, then sending, by the master control device, the instruction notification directly to the network access device; and
if the master control device is not connected directly with the network access device, then sending, by the master control device, the instruction notification to the server, so that the server generates an indication message according to the instruction information carried in the instruction notification, and sends the indication message to the network access device.

* * * * *